(12) United States Patent
Yamamoto

(10) Patent No.: US 7,207,546 B2
(45) Date of Patent: Apr. 24, 2007

(54) ELECTROMAGNETIC ACTUATOR

(75) Inventor: Shigeharu Yamamoto, Kariya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 65 days.

(21) Appl. No.: 11/091,772

(22) Filed: Mar. 29, 2005

(65) Prior Publication Data
US 2005/0211935 A1   Sep. 29, 2005

(30) Foreign Application Priority Data
Mar. 29, 2004   (JP)   ............... P2004-095743

(51) Int. Cl.
*F16K 31/06* (2006.01)
(52) U.S. Cl. .................... 251/129.15
(58) Field of Classification Search ............ 251/129.15
See application file for complete search history.

(56) References Cited

U.S. PATENT DOCUMENTS 2,948,298 A   8/1960   Gardner 5,092,365 A * 3/1992 Neff ...................... 137/625.65

FOREIGN PATENT DOCUMENTS

| DE | 3612335 A1 | 10/1987 |
|---|---|---|
| EP | 0 676 548 A1 | 10/1995 |
| JP | 10-122404 | 5/1998 |
| JP | 10 122404 A | 8/1998 |
| WO | WO 91/05195 A | 4/1991 |

OTHER PUBLICATIONS

European Search Report , dated Nov. 7, 2005.

* cited by examiner

*Primary Examiner*—J. Casimer Jacyna
(74) *Attorney, Agent, or Firm*—Finnegan, Henderson, Farabow, Garrett & Dunner, L.L.P.

(57) ABSTRACT

An electromagnetic actuator includes: a valve body part formed in a substantially cylindrical shape and provided with: an opening to be connected to an external fluid passage; a valve accommodated in the valve body part; and a groove having an inclined face; a solenoid part that actuates a valve; and a seal member that is fitted on an outer peripheral of the inclined face to be urged in an axial direction of the valve body part.

12 Claims, 3 Drawing Sheets

BEFORE ASSEMBLING

AFTER ASSEMBLING

BEFORE ASSEMBLING

AFTER ASSEMBLING

WHILE VALVE IS OFF

WHILE VALVE IS ON

ELECTROMAGNETIC ACTUATOR

BACKGROUND OF THE INVENTION

1. Field of the Invention

The present invention relates to an electromagnetic actuator including a solenoid for electromagnetically actuating a valve, and more particularly, to a seal structure for a fluid passage between a valve body part of the electromagnetic actuator and a member in which the valve body part is engaged and arranged.

2. Description of the Related Art

Heretofore, an electromagnetic valve has been used as a control valve for a fluid which is employed for controlling vehicles, and various structures have been proposed considering adaptability to various kinds of devices (For example, See FIG. 1 of JP-A-10-122404).

In JP-A-10-122404, an electromagnetic valve 10 including a valve body part 14, a solenoid part 16, and an installing bracket 18 is disclosed. On occasion of assembling the electromagnetic valve 10, in order to position the valve body part 14 around an axis according to hydraulic devices having different fluid passages, a spool housing 20 is rotated around an axis so as to align ports 20b to 20f respectively with fluid passages 24, 26, 28, 30, 32, and at the same time, the valve body part 14, the solenoid part 16, and the installing bracket 18 are fixed by caulking to one another by means of a caulking projection 18d provided on the installing bracket 18, in a state where the installing bracket 18 and the solenoid part 16 are positioned at a desired angle.

SUMMARY OF THE INVENTION

However, a seal structure of the electromagnetic valve in JP-A-10-122404 has the following problem. In case of the electromagnetic valve which is employed, for example, in a hydraulic control system for cooling an engine, because a cylinder block and a cam cover are composed of separate components, it has sometimes happened that the valve body part of the electromagnetic valve is unable to be inserted due to axial displacement or thermal deformation of the components when they are assembled, or the valve cannot be actuated but locked, due to stress exerted on the valve body part of the electromagnetic valve in a direction perpendicular to the axial direction.

For the purpose of solving this problem, there has been proposed such a structure that a seal member is fitted to a tip end of the valve body part of the electromagnetic valve, and the seal member is pressed with an end face of the cylinder block. However, in case where the fluid passage includes a plurality of oil passages which are radially formed on an outer peripheral of a mounting hole in the cam cover to which the valve body part of the electromagnetic valve is mounted, a problem that oil may leak between the oil passages along the outer peripheral of the mounting hole will occur.

Under the circumstances, the invention has been made in view of the above described problem, and it is one of technical objects of the invention to provide an electromagnetic actuator which can secure sealing performance between a valve body part and a fluid passage.

According to a first aspect of the invention, there is provided an electromagnetic actuator including: a valve body part formed in a substantially cylindrical shape and provided with: an opening to be connected to an external fluid passage; a valve accommodated in the valve body part; and a groove having an inclined face; a solenoid part that actuates a valve; and a seal member that is fitted on an outer peripheral of the inclined face to be urged in an axial direction of the valve body part.

According to a second aspect of the invention, there is provided a mounting structure for mounting an electromagnetic actuator to a member having a fluid passage, the mounting structure including: a member provided with a fluid passage and an engaging part; and an electromagnetic actuator including: a valve body part formed in a substantially cylindrical shape and provided with: an opening to be connected to the fluid passage a valve accommodated in the valve body part; and a groove having an inclined face; a solenoid part that actuates a valve; and a seal member that is fitted on an outer peripheral of the inclined face to be urged in an axial direction of the valve body part, wherein the valve body part is engaged into the engaging part.

BRIEF DESCRIPTION OF THE DRAWINGS

These and other objects and advantages of the present invention will become more fully apparent from the following detailed description taken with the accompanying drawings, in which.

DETAILED DESCRIPTION OF THE PREFERRED EMBODIMENTS

Referring now to the accompanying drawings, a description will be given in detail of a preferred embodiment of the invention.

Figure 1:
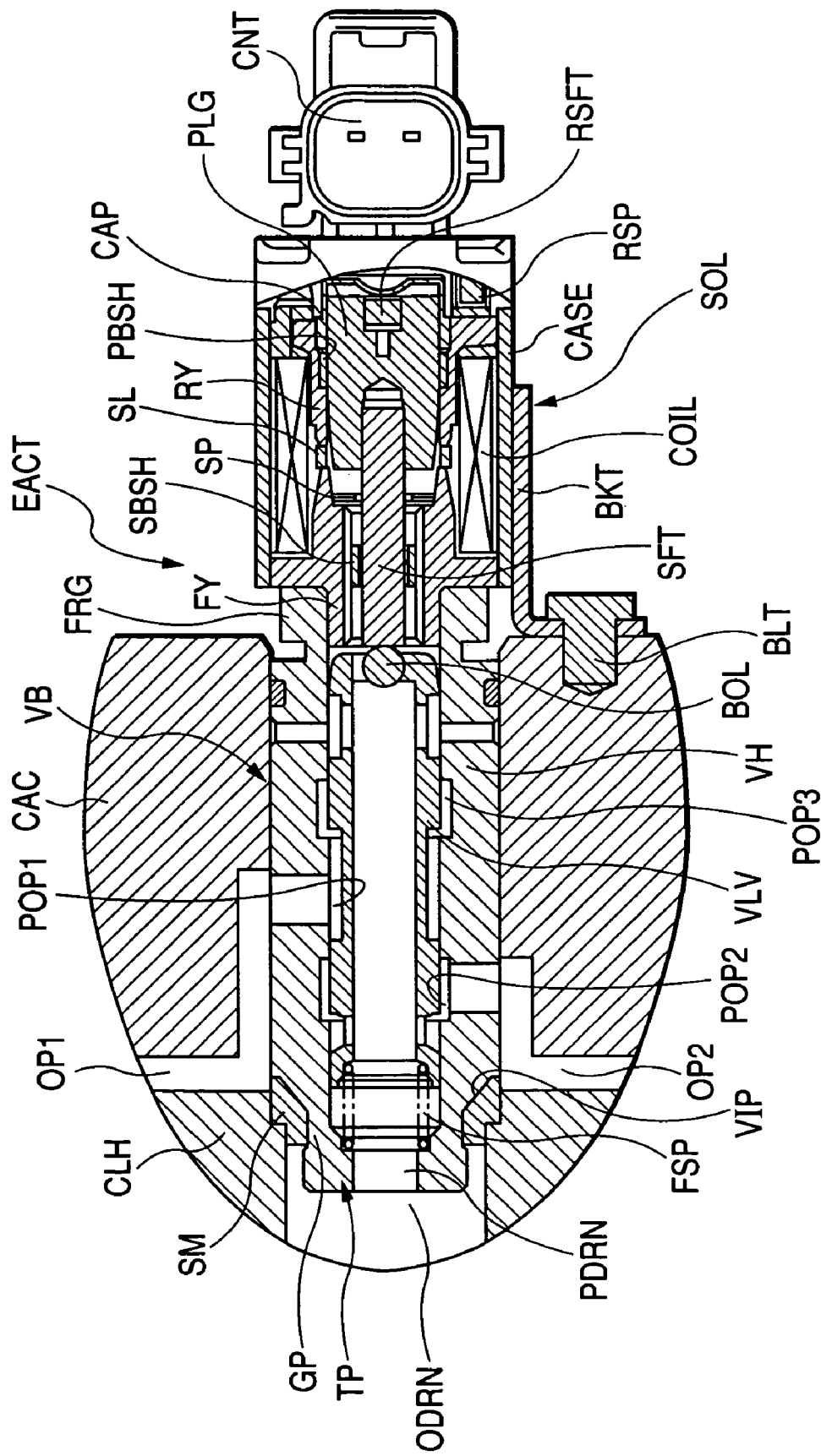
FIG. 1 is a fragmentary sectional view schematically showing an electromagnetic actuator in an embodiment of the invention.

FIG. 1 is a fragmentary sectional view showing a structure of an electromagnetic actuator EACT according to the invention. The electromagnetic actuator EACT is mounted on a cylinder head CLH and a cam cover CAC of a main device, which is not shown, for conducting variable valve timing control of an internal combustion engine. The cylinder head CLH is provided with a return oil passage ODRN for oil returning from the electromagnetic actuator EACT to the main device, and the cam cover CAC is provided with a plurality of oil passages OP1, OP2, and OP3 which are radially formed with respect to an axis of a valve body part VB of the electromagnetic actuator EACT. The electromagnetic actuator EACT includes the valve body part VB, a solenoid part SOL, and a bracket BKT for installing the electromagnetic actuator EACT to the cam cover CAC. The bracket BKT serves to fix the electromagnetic actuator EACT to the cam cover CAC by means of a bolt BLT, and at the same time, to urge a seal member SM.

In the embodiment, the bracket BKT serves as an urging member that urges the seal member SM.

The valve body part VB includes a valve housing VH which is engaged in the cam cover CAC, a valve VLV which is arranged inside the valve housing VH so as to slide in an axial direction, and a spring FSP for urging the valve VLV toward the solenoid part SOL. The valve housing VH is a member in a substantially cylindrical shape, and a flange part FRG is attached to its one end (a right end in FIG. 1).

The valve body part VB is provided with ports PDRN, POP1, POP2, and POP3 so that an inside thereof is communicated with the oil passages ODRN, OP1, OP2, and OP3 which are formed in the cylinder head CLH and the cam cover CAC to which the valve body part VB is fixed. The valve VLV having an outer diameter which is substantially the same as an inner diameter of the valve body part VB is coaxially arranged inside the valve body part VB.

A groove GP having an inclined face VIP in a substantially conical shape is formed in a tip end part TP of the valve body part VB in a left end part in FIG. 1. The seal member SM is fitted to this groove GP. Although material of this seal member SM is selected according to fluid to be sealed, the material is selected mainly from synthetic rubber such as nitrile rubber, acryl rubber, styrol rubber, fluorine rubber, and ethylene propylene rubber. A ball BOL is arranged at the right end of the valve VLV in FIG. 1, so as to be in contact with a plunger PLG of the solenoid part SOL.

In the solenoid part SOL, a bobbin made of resin is arranged inside a case CASE which is an outer casing, and a coil COIL is wound around the bobbin. Further, inside the case CASE, the plunger PLG and a shaft SFT for actuating the valve VLV of the valve body part VB by electromagnetic force generated by energizing the coil COIL are arranged in an axial direction. The shaft SFT is press-fitted into the plunger PLG so as to be substantially coaxial therewith. The plunger PLG which is integral with the shaft SFT is slidably supported by bushes PBSH and SBSH which function as bearings.

Around the plunger PLG, a front yoke FY and a rear yoke RY for forming a magnetic circuit, and the case CASE are arranged. The coil COIL and a connecter CNT are electrically connected by means of a spring RSP. This spring RSP can absorb positional differences between the components on occasion of assembling. A cap CAP is press-fitted into the rear yoke RY to secure sealing performance with respect to the coil COIL, and determines an original position of the plunger PLG (the position of the plunger PLG while the coil COIL is not energized).

Figure 2A:
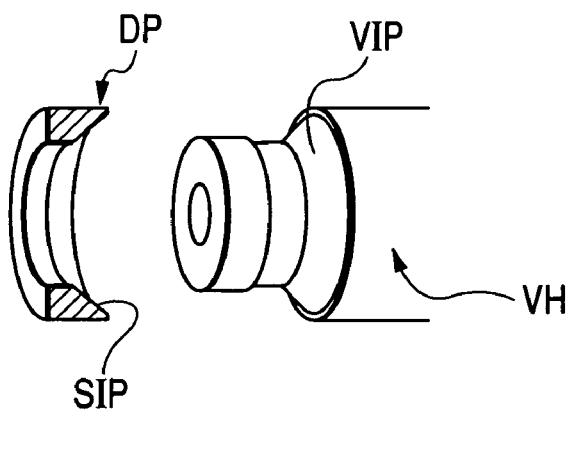
FIGS. 2A and 2B are schematic views showing a seal member of the embodiment before and after the seal member is assembled.
Figure 2B:
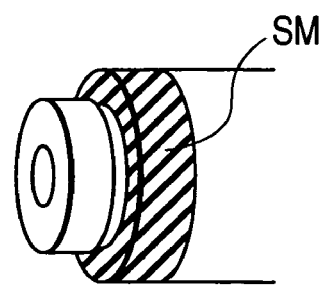

FIGS. 2A and 2B are schematic views of the seal member SM which is fitted to the tip end part TP of the valve housing VH, before and after it is assembled. The seal member SM which has a substantially cylindrical shape and a substantially trapezoidal sectional shape in the axial direction of the valve housing VH is designed in such a manner that its outer diameter will be substantially the same as that of the valve housing VH when it has been fitted to the valve housing VH. The inclined face VIP formed in the groove GP of the valve housing VH is so designed as to be in tight contact with an inclined face SIP which is formed on an inner peripheral face of the seal member SM.

Figure 3A:
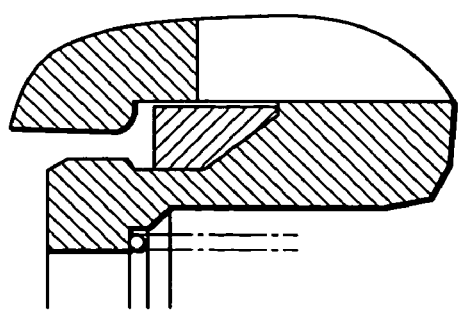
FIGS. 3A and 3B are schematic views showing a manner in which the seal member shown in FIGS. 2A and 2B is deformed.
Figure 3B:
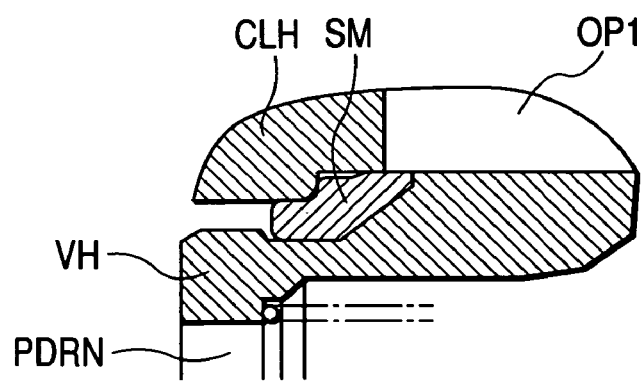

FIGS. 3A and 3B show the seal member SM before and after the seal member SM is assembled between the cylinder head CLH and the valve housing VH. A portion of the seal member SM which has come into contact with an inner peripheral face of the cylinder head CLH will be deformed, as the valve housing VH is urged against the cylinder head CLH. At the same time, a deformed portion DP of the seal member SM will move toward the oil passage OP1 along the inclined face VIP of the valve housing VH. A tip end of the deformed portion DP of the seal member SM which is formed at an acute angle will be deformed so as to enter into the oil passage OP1 in a manner of filling a gap between the cylinder head CLH and the valve housing VH. Consequently, sealing performance between the outer peripheral of the valve housing VH and the oil passage OP1 can be secured. Further, because the seal member SM is arranged between the cylinder head CLH and the outer peripheral of the valve housing VH, sealing performance in a circumferential direction between the cylinder head CLH and the valve housing VH can be also secured. As the results, sealing performance between the return oil passage ODRN and the oil passage OP1 can be secured, and at the same time, sealing performance between the return oil passage ODRN and the oil passage OP2 can be also secured. Accordingly, sealing performance between the respective oil passages which are radially arranged in a circumferential direction of the valve VLV, that is, the sealing performance between the oil passage OP1 and the oil passage OP2 can be also secured.

Figure 4A:
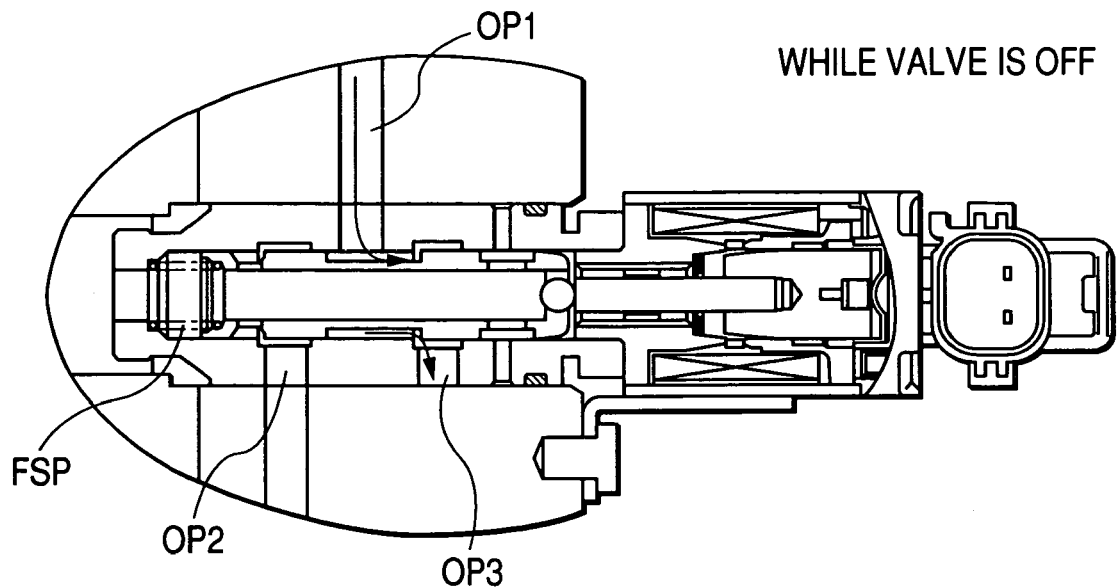
FIGS. 4A and 4B are schematic views showing operation of the electromagnetic actuator in the embodiment.
Figure 4B:
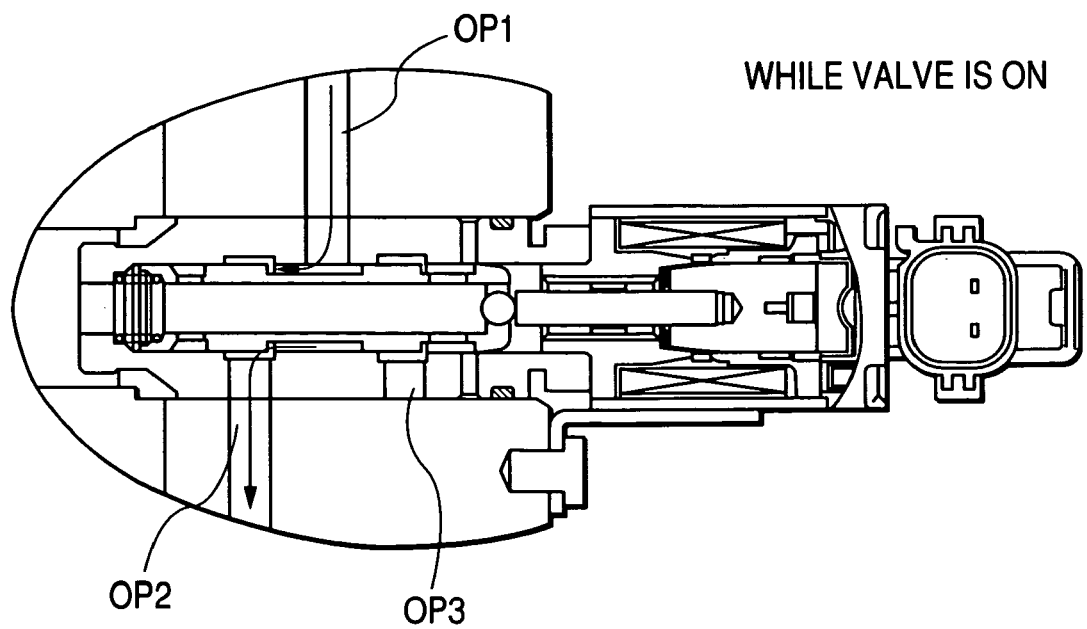

FIG. 4 is a schematic view showing operation of the electromagnetic actuator EACT. In a state where the solenoid part SOL is not yet energized as shown in FIG. 4(a), the valve VLV is urged to the right in FIG. 4 by means of the spring FSP. As the results, the oil flowing from the oil passage OP1 to the valve VLV will flow through the port POP1 to the oil passage OP3. On the other hand, when the solenoid part SP is energized, the plunger PLG will move to the left in FIG. 4, and accordingly, the valve VLV will also move to the left. Then, the port POP1 will be communicated with the port POP2, and thus, the oil flowing from the oil passage OP1 to the valve VLV will be controlled so as to flow into the oil passage OP2.

As described with reference to the embodiment, there is provided an electromagnetic actuator including: a valve body part formed in a substantially cylindrical shape and provided with: an opening to be connected to an external fluid passage; a valve accommodated in the valve body part; and a groove having an inclined face; a solenoid part that actuates a valve; and a seal member that is fitted on an outer peripheral of the inclined face to be urged in an axial direction of the valve body part.

According to the configuration, the seal member is fitted to the outer peripheral of the valve body part of the electromagnetic actuator, and the seal member is urged by the urging means in the axial direction of the valve body part of the electromagnetic actuator, whereby sealing performance between the member and the valve body part on a plane perpendicular to the axial direction can be secured.

The seal member has a width in the axial direction in which the valve body part is engaged. When this seal member is urged, the seal member will move along the inclined face which is formed in the groove of the valve body part. As the results, sealing performance in a circumferential direction between an inner peripheral face of the engaging part of the member and the outer peripheral of the valve body part can be also secured, at the same time.

The seal member is an elastic member and formed at an acute angle in a direction of being urged. In other words, a tip end of the seal member has a tapered shape in the direction of being urged. Therefore, in the urged state, the seal member will swell in a direction perpendicular to the direction of being urged thereby to secure the sealing performance. In this manner, it is possible to effectively secure the sealing performance in a direction where the components are to be sealed.

In order to further secure the sealing performance, the valve body part of the electromagnetic actuator to be contacted with the seal member is provided with the inclined face. Therefore, when the seal member is urged, the seal member will move along the inclined face of the valve body part, and will be further deformed so as to swell in a direction perpendicular to a direction of movement. In this manner, it is possible to effectively secure the sealing performance.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments are chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. An electromagnetic actuator comprising:
    a valve body part formed in a substantially cylindrical shape and provided with:
        an opening to be connected to an external fluid passage;
        a valve accommodated in the valve body part; and
        a groove having an inclined face, wherein the groove is located on an outer peripheral of the valve body part;
    a solenoid part that actuates a valve; and
    a seal member that is fitted in the groove on the inclined face, the seal member to be urged in an axial direction of the valve body part.

2. The electromagnetic actuator according to claim 1, further comprising an urging member that urges the seal member in the axial direction.

3. The electromagnetic actuator according to claim 1, wherein the seal member is configured to deform in a radial direction of the valve body part when urged in the axial direction.

4. The electromagnetic actuator according to claim 3, wherein the seal member has a width in the axial direction to deform in the radial direction when urged in the axial direction.

5. The electromagnetic actuator according to claim 1, wherein the seal member is made of an elastic member and includes a deformed portion formed at an acute angle with respect to a plane in parallel with the axial direction, the deformed portion being configured to be urged.

6. The electromagnetic actuator according to claim 1, wherein the inclined face is formed on a contacting face where the valve body part contacts with the seal member.

7. A mounting structure for mounting an electromagnetic actuator to a member having a fluid passage, the mounting structure comprising:
    a member provided with a fluid passage and an engaging part; and
    an electromagnetic actuator including:
        a valve body part formed in a substantially cylindrical shape and provided with:
            an opening to be connected to the fluid passage;
            a valve accommodated in the valve body part; and
            a groove having an inclined face, wherein the groove is located on an outer peripheral of the valve body part;
        a solenoid part that actuates a valve; and
        a seal member that is fitted in the groove on the inclined face, the seal member to be urged in an axial direction of the valve body part, wherein the valve body part is engaged into the engaging part.

8. The mounting structure according to claim 7, further comprising an urging member that urges the seal member in the axial direction.

9. The mounting structure according to claim 7, wherein the seal member is configured to deform in a radial direction of the valve body part when urged in the axial direction.

10. The mounting structure according to claim 9, wherein the seal member has a width in the axial direction to deform in the radial direction when urged in the axial direction.

11. The mounting structure according to claim 7, wherein the seal member is made of an elastic member and includes a deformed portion formed at an acute angle with respect to a plane in parallel with the axial direction, the deformed portion being configured to be urged.

12. The mounting structure according to claim 7, wherein the inclined face is formed on a contacting face where the valve body part contacts with the seal member.

* * * * *